UNITED STATES PATENT OFFICE.

WILLIAM J. KEE, OF METUCHEN, NEW JERSEY, ASSIGNOR TO THE KALBFLEISCH CORPORATION, OF NEW YORK, N. Y., A CORPORATION OF NEW YORK.

PROCESS OF MAKING SALT CAKE AND SULFURIC ACID FROM NITER CAKE.

1,313,192.   Specification of Letters Patent.   Patented Aug. 12, 1919.

No Drawing.   Application filed September 19, 1918. Serial No. 254,730.

*To all whom it may concern:*

Be it known that I, WILLIAM J. KEE, of Metuchen, in the county of Middlesex and in the State of New Jersey, have invented a certain new and useful Improvement in Processes of Making Salt Cake and Sulfuric Acid from Niter Cake, and do hereby declare that the following is a full, clear, and exact description thereof.

This invention relates to the conversion of niter cake into sodium sulfate (salt cake) and sulfuric acid, and it pertains especially to a process of decomposing niter cake by heating the same to a high temperature.

It has heretofore been proposed, when converting niter cake into salt cake and sulfuric acid with the aid of heat, to mix the niter cake before it is heated with an equal weight of silica or other material which will serve to prevent the mass from becoming liquid at the temperature at which the niter cake gives off sulfur trioxid. Such procedure, however, entails the following disadvantages: The materials before mixing must be brought to the proper degree of fineness or subdivision, and even when this is done it is difficult to produce a homogeneous mixture. The yield from a given number of furnaces is only about 50% of that obtained when the niter cake is heated alone, due to the fact that the charge for each furnace, when a mixture is used, contains only half the niter cake which could be used if the charge were made up entirely of niter cake. Finally there is a great waste of heat due to the necessity of heating a great mass of inert material to a high temperature.

In working with niter cake without admixtures, on the other hand, the chief disadvantages are the action of the molten mass on the walls of the furnace, and the difficulty in removing the salt cake residue which tends to form a hard mass on solidification. It is the removal of the salt cake which has given the most trouble, the action of the molten mass on the refractory linings of the molten mass on the refractory linings which are now commonly used, being relatively unimportant.

One object of my invention is to dispense with inert admixtures such as silica, and avoid the difficulties and loss in efficiency entailed thereby.

Another object of the invention is to facilitate the removal of the salt cake residue from the furnace at the end of the process.

In carrying out the process in accordance with my invention the ordinary niter cake ($NaHSO_4$), without other materials being mixed therewith, is maintained at a temperature corresponding to, or somewhat above, the melting point of salt cake. When the evolution of sulfur trioxid is about completed there is added to the molten mass a small proportion, for instance 5–10%, of solid non-combustible material such as niter cake or salt cake, either of which may be referred to generically as a sulfate of sodium. By proceeding in this manner the molten mass upon being stirred solidifies in such a friable condition that it may be easily broken up and removed. The niter cake or salt cake which is added takes up heat from the surrounding molten mass and chills the same sufficiently to cause the mass to solidify. Immediately after this solidification occurs, the friable solid must be removed from the furnace, since the heat of the furnace is such that the mass if left therein would be melted again in a very short time. Niter cake and salt cake are used in preference to other materials as cooling agents since they do not form extraneous substances in the salt cake residue. The process may be illustrated in greater detail by the following example:

One thousand parts of niter cake are charged into a suitable reverberatory furnace maintained at a constant temperature corresponding to the melting point of salt cake or a little above. The cake is quickly melted and decomposes quite rapidly into salt cake and sulfuric acid, the reaction apparently going in accordance with the following equations:

$$2NaHSO_4 + heat = Na_2S_2O_7 + H_2O$$
$$Na_2S_2O_7 + heat = Na_2SO_4 + SO_3$$

When the evolution of sulfur trioxide has practically ceased, indicating that the reaction has been practically brought to completion, that is when there is only 1% or less of niter cake which remains undecomposed, the molten mass in the furnace will consist of about 600 parts of salt cake. At this time and while the molten mass is being well stirred, there are added to it from 30 to 60 parts of niter cake or salt cake. The niter cake has a little greater freezing action than an equal weight of salt cake since it absorbs heat in decomposing into water, sulfur trioxid and sodium sulfate. Within a very short time after the niter cake or salt cake has been added, the molten mixture solidifies into a friable, lumpy mass which is easily withdrawn from the furnaces with a hoe or similar instrument. This withdrawal however must be accomplished without delay, since if the mass again becomes melted it is difficult to remove.

It will be evident from the above description that the new process offers many advantages over those heretofore known. By causing incipient freezing of the molten salt cake by adding thereto solid niter cake or solid salt cake in small amount, the cooling of the furnace at the end of each operation to permit the salt cake to solidify and to be removed is rendered unnecessary.

It will be understood that various changes in detail may be made in the above described process without departing from the scope of my invention.

I claim:

1. The process of producing salt cake and sulfuric acid from niter cake which comprises melting niter cake in a suitable furnace, maintaining the niter cake at such a temperature that it becomes converted into molten salt cake with evolution of sulfur trioxid, adding a sufficient proportion of a sulfate of sodium in the solid condition to the continually stirred molten mass when the reaction is substantially completed to cause the molten mass to solidify, and then withdrawing the solid salt cake from the furnace.

2. The process of producing salt cake and sulfuric acid from niter cake which comprises melting niter cake in a suitable furnace, maintaining the niter cake at about the melting point of salt cake until it becomes converted into molten salt cake with evolution of sulfur trioxid, adding from about 5 to 10% based on the weight of molten salt cake of a sulfate of sodium in the solid condition to the continually stirred molten mass when the reaction is substantially completed to cause the molten mass to solidify, and then withdrawing the solid salt cake from the furnace.

3. In the process of producing salt cake and sulfuric acid from niter cake by decomposing the latter in a suitable furnace at a temperature above the melting point of salt cake, the steps which comprise adding a sufficient amount of solid non-combustible material to the molten salt cake residue, while stirring, to cause solidification thereof, and withdrawing the solidified material from the furnace before the salt cake becomes remelted.

4. In the process of producing salt cake and sulfuric acid from niter cake by decomposing the latter in a suitable furnace at a temperature above the melting point of salt cake, the steps which comprise adding a sufficient amount of a sulfate of sodium in the solid condition to the molten salt cake residue, while stirring, to cause solidification thereof, and withdrawing the solidified material from the furnace before the salt cake becomes remelted.

5. In the process of producing salt cake and sulfuric acid from niter cake by decomposing the latter in a suitable furnace at a temperature above the melting point of salt cake, the steps which comprise adding to the molten salt cake residue, while stirring, from about 5 to 10% of a sulfate of sodium in the solid condition, based on the weight of said molten salt cake, to cause the latter to solidify, and then withdrawing the resulting easily disintegrated solid salt cake from the furnace.

In testimony that I claim the foregoing I have hereunto set my hand.

WILLIAM J. KEE.

Witnesses:
 CHAS. BILGER, Jr.,
 EDWARD O. HEYDT.